(12) United States Patent
King et al.

(10) Patent No.: US 9,289,922 B2
(45) Date of Patent: Mar. 22, 2016

(54) DEVICE AND METHOD FOR SURFACE REPLICATION

(75) Inventors: James M. King, Deep River (CA); Walter Benz, Deep River (CA)

(73) Assignee: ATOMIC ENERGY OF CANADA LIMITED/ENERGIE, Ontario (CA)

( * ) Notice: Subject to any disclaimer, the term of this patent is extended or adjusted under 35 U.S.C. 154(b) by 1322 days.

(21) Appl. No.: 11/621,060

(22) Filed: Jan. 8, 2007

(65) Prior Publication Data

US 2015/0147426 A1    May 28, 2015

(30) Foreign Application Priority Data

Nov. 14, 2006  (CA) ..................................... 2567936

(51) Int. Cl.
| | |
|---|---|
| *B29C 39/24* | (2006.01) |
| *B29C 39/02* | (2006.01) |
| *B29C 35/02* | (2006.01) |
| *B29C 39/00* | (2006.01) |
| *G21C 17/007* | (2006.01) |
| *B29K 83/00* | (2006.01) |

(52) U.S. Cl.
CPC ........... *B29C 39/026* (2013.01); *B29C 35/0261* (2013.01); *B29C 39/003* (2013.01); *B29C 39/24* (2013.01); *G21C 17/007* (2013.01); *B29K 2083/005* (2013.01)

(58) Field of Classification Search
USPC ......................................................... 425/178
See application file for complete search history.

(56) References Cited

U.S. PATENT DOCUMENTS

| | | | |
|---|---|---|---|
| 1,953,452 | A | 4/1934 | Wertz |
| 2,155,334 | A | 4/1939 | Sitkin et al. |
| 2,349,607 | A | 5/1944 | Berger |
| 2,416,441 | A | 2/1947 | Grant et al. |
| 2,428,773 | A | 10/1947 | Beresin et al. |
| 2,452,903 | A | 11/1948 | Coffey |
| 2,458,145 | A | 1/1949 | Coffey |
| 2,524,737 | A | 10/1950 | Sawyer |
| 2,587,476 | A | 2/1952 | Huhn |
| 2,601,703 | A | 7/1952 | Sawyer |
| 2,618,014 | A | 11/1952 | Sawyer et al. |

(Continued)

FOREIGN PATENT DOCUMENTS

| | | |
|---|---|---|
| CA | 1005755 | 2/1977 |
| CA | 1007078 | 3/1977 |

(Continued)

OTHER PUBLICATIONS

Korean Intellectual Property Office, "Notice of Final Rejection," issued in connection with Korean Patent Application No. 10-2007-10846, dated Apr. 21, 2014, English language Translation.

(Continued)

*Primary Examiner* — Ryan Ochylski
(74) *Attorney, Agent, or Firm* — Sughrue Mion, PLLC

(57) ABSTRACT

The present invention provides a replication device for delivering a replicating material to a surface. The device includes an extrusion piston slidably received therein and movable to a dispensing position for expelling the replicating material though an outlet. The device further includes an actuator, wherein the actuator produces stress waves so as to temporarily reduce the viscosity of the material during delivery of said material. Also provided is a method and kit for using the device for obtaining a replica of a surface.

26 Claims, 4 Drawing Sheets

(56) References Cited

U.S. PATENT DOCUMENTS

| | | | |
|---|---|---|---|
| 2,653,474 A | 9/1953 | Santiago | |
| 2,667,070 A | 1/1954 | Sockman et al. | |
| 2,764,556 A | 9/1956 | Sockman et al. | |
| 2,797,179 A | 6/1957 | Reynolds et al. | |
| 3,046,601 A | 7/1962 | Hubbert et al. | |
| 3,049,752 A | 8/1962 | Jorda et al. | |
| 3,326,293 A | 6/1967 | Skipper | |
| 3,357,104 A | 12/1967 | Greene et al. | |
| 3,364,993 A | 1/1968 | Skipper | |
| 3,417,971 A | 12/1968 | Blank et al. | |
| 3,436,828 A | 4/1969 | Dragan | |
| 3,445,759 A | 5/1969 | Pevar | |
| 3,530,587 A | 9/1970 | Anderson | |
| 3,546,130 A | 12/1970 | Magdalin | |
| 3,722,097 A | 3/1973 | Colman et al. | |
| 3,738,006 A | 6/1973 | Lopez et al. | |
| 3,767,085 A | 10/1973 | Cannon et al. | |
| 3,776,989 A | 12/1973 | Annis, Jr. et al. | |
| 3,830,094 A | 8/1974 | Leger | |
| 3,841,932 A | 10/1974 | Forler et al. | |
| 3,855,854 A | 12/1974 | Hutchison et al. | |
| 3,862,047 A | 1/1975 | Weltman | |
| 3,894,823 A | 7/1975 | Hanning | |
| 3,905,227 A | 9/1975 | Kinley | |
| 3,947,177 A | 3/1976 | Eckardt | |
| 3,963,654 A | 6/1976 | Hutchison et al. | |
| 3,966,871 A | 6/1976 | Schroder | |
| 3,978,716 A | 9/1976 | Kirschke | |
| 3,983,906 A | 10/1976 | Hutchison et al. | |
| 3,993,520 A | 11/1976 | Werner et al. | |
| 3,995,483 A | 12/1976 | Hartong et al. | |
| 4,014,966 A | 3/1977 | Hanning | |
| 4,043,740 A | 8/1977 | Gellert | |
| 4,106,887 A | 8/1978 | Yasuike et al. | |
| 4,124,547 A | 11/1978 | Hutchison et al. | |
| 4,132,516 A | 1/1979 | Story | |
| 4,188,724 A | 2/1980 | Lichon | |
| 4,198,362 A | 4/1980 | Ticker et al. | |
| 4,200,478 A | 4/1980 | Jacino et al. | |
| 4,207,282 A | 6/1980 | Grisch | |
| 4,212,627 A | 7/1980 | Gellert | |
| 4,255,140 A | 3/1981 | Marshall | |
| 4,264,305 A | 4/1981 | Rasmussen et al. | |
| 4,286,941 A | 9/1981 | Gellert | |
| 4,302,499 A | 11/1981 | Grisch | |
| 4,303,608 A | 12/1981 | Ticker et al. | |
| 4,340,562 A | 7/1982 | Gross et al. | |
| 4,346,588 A | 8/1982 | Tuttle | |
| 4,349,324 A | 9/1982 | Neff et al. | |
| 4,378,211 A | 3/1983 | Lococo | |
| 4,380,426 A | 4/1983 | Wiles | |
| 4,382,785 A | 5/1983 | Lococo | |
| 4,385,015 A | 5/1983 | Klettke | |
| 4,419,305 A | 12/1983 | Matles | |
| 4,433,969 A | 2/1984 | Gellert | |
| 4,472,141 A | 9/1984 | Dragan | |
| 4,483,675 A | 11/1984 | Marshall | |
| 4,492,576 A | 1/1985 | Dragan | |
| 4,531,914 A | 7/1985 | Spinello | |
| 4,538,920 A | 9/1985 | Drake | |
| 4,541,976 A | 9/1985 | Batigne et al. | |
| 4,555,295 A | 11/1985 | Orikasa et al. | |
| 4,569,662 A | 2/1986 | Dragan | |
| 4,569,815 A | 2/1986 | Rentz et al. | |
| 4,597,727 A | 7/1986 | Birkhauser, III | |
| 4,616,987 A | 10/1986 | Boyers et al. | |
| 4,619,613 A | 10/1986 | Dragan | |
| 4,659,530 A | 4/1987 | Boyers et al. | |
| 4,681,520 A | 7/1987 | Birkhauser, III | |
| 4,692,291 A | 9/1987 | Angell, Jr. | |
| 4,732,204 A | 3/1988 | Tabardin | |
| 4,753,536 A | 6/1988 | Spehar et al. | |
| 4,753,695 A | 6/1988 | Alexander et al. | |
| 4,759,211 A | 7/1988 | Longley-Cook | |
| 4,775,305 A | 10/1988 | Alexander et al. | |
| 4,783,295 A | 11/1988 | Kearns et al. | |
| 4,784,607 A | 11/1988 | Francois | |
| 4,840,551 A | 6/1989 | Lay et al. | |
| 4,851,169 A | 7/1989 | Lay et al. | |
| 4,861,401 A | 8/1989 | Miura et al. | |
| 4,919,603 A | 4/1990 | Herold et al. | |
| 4,961,883 A | 10/1990 | Jacino et al. | |
| 4,963,095 A | 10/1990 | Weissman | |
| 4,995,540 A | 2/1991 | Colin et al. | |
| 5,026,510 A | 6/1991 | Yashima | |
| 5,033,650 A | 7/1991 | Colin et al. | |
| 5,058,769 A | 10/1991 | Kurtz | |
| 5,122,042 A | 6/1992 | Einiger | |
| 5,122,056 A | 6/1992 | Barbee | |
| 5,122,313 A | 6/1992 | Yashima | |
| 5,174,937 A | 12/1992 | Tamura et al. | |
| 5,209,935 A | 5/1993 | Jacino et al. | |
| 5,234,633 A | 8/1993 | Imataki et al. | |
| 5,244,388 A | 9/1993 | Frush | |
| 5,275,776 A | 1/1994 | Hara et al. | |
| 5,324,186 A | 6/1994 | Bakanowski | |
| 5,342,190 A | 8/1994 | Salter | |
| 5,344,302 A | 9/1994 | Beehler et al. | |
| 5,344,304 A | 9/1994 | Tamura et al. | |
| 5,389,313 A | 2/1995 | Imataki et al. | |
| 5,401,152 A | 3/1995 | Jacino et al. | |
| 5,413,258 A | 5/1995 | Kartler | |
| 5,424,020 A | 6/1995 | Hara et al. | |
| 5,554,800 A | 9/1996 | Jonsson | |
| 5,566,860 A | 10/1996 | Schiltz et al. | |
| 5,622,726 A | 4/1997 | Tanner | |
| 5,622,728 A | 4/1997 | Kartler | |
| 5,653,534 A | 8/1997 | Matsumoto et al. | |
| 5,670,180 A | 9/1997 | Mackey et al. | |
| 5,695,339 A | 12/1997 | Abere | |
| 5,722,829 A | 3/1998 | Wilcox et al. | |
| 5,743,436 A | 4/1998 | Wilcox et al. | |
| 5,798,128 A | 8/1998 | Dumazet et al. | |
| 5,816,804 A | 10/1998 | Fischer | |
| 5,819,988 A | 10/1998 | Sawhney et al. | |
| 5,897,882 A | 4/1999 | Gonzalez et al. | |
| 5,944,226 A | 8/1999 | Schiltz et al. | |
| 5,954,901 A | 9/1999 | Henderson | |
| 6,065,645 A | 5/2000 | Sawhney et al. | |
| 6,068,043 A * | 5/2000 | Clark | 164/46 |
| 6,074,582 A | 6/2000 | Jacino et al. | |
| 6,105,822 A | 8/2000 | Larsen et al. | |
| 6,110,401 A | 8/2000 | Lee et al. | |
| 6,116,905 A | 9/2000 | Hoos | |
| 6,190,150 B1 | 2/2001 | Beveridge | |
| 6,200,054 B1 | 3/2001 | Chen | |
| 6,234,359 B1 | 5/2001 | Brown et al. | |
| 6,287,490 B2 | 9/2001 | Rheinberger et al. | |
| 6,287,491 B1 | 9/2001 | Kilim et al. | |
| 6,309,493 B1 | 10/2001 | Braun et al. | |
| 6,331,266 B1 | 12/2001 | Powell et al. | |
| 6,336,359 B1 | 1/2002 | Kawazoe et al. | |
| 6,342,178 B1 | 1/2002 | Matsuoka et al. | |
| 6,394,314 B1 | 5/2002 | Sawhney et al. | |
| 6,398,761 B1 | 6/2002 | Bills et al. | |
| 6,478,561 B2 | 11/2002 | Braun et al. | |
| 6,484,570 B2 | 11/2002 | Kawazoe et al. | |
| 6,485,281 B1 | 11/2002 | Curl | |
| 6,491,855 B1 | 12/2002 | Harper | |
| 6,589,036 B1 | 7/2003 | Rawlins et al. | |
| 6,607,683 B1 | 8/2003 | Harrington | |
| 6,626,912 B2 | 9/2003 | Speitling | |
| 6,641,767 B2 | 11/2003 | Zhang et al. | |
| 6,663,371 B2 | 12/2003 | Curl | |
| 6,676,408 B1 | 1/2004 | Bushnell et al. | |
| 6,685,784 B1 | 2/2004 | Jacino et al. | |
| 6,730,246 B2 | 5/2004 | Price et al. | |
| 6,769,913 B2 | 8/2004 | Hurson | |
| 6,786,724 B1 | 9/2004 | Kwong | |
| 6,817,861 B1 | 11/2004 | Roetzer | |
| 6,843,652 B2 | 1/2005 | Xie et al. | |
| 6,845,809 B1 * | 1/2005 | Norville et al. | 164/113 |
| 2001/0001510 A1 | 5/2001 | Rheinberger et al. | |
| 2001/0011783 A1 * | 8/2001 | Stecker | 264/246 |

(56) References Cited

U.S. PATENT DOCUMENTS

| | | |
|---|---|---|
| 2001/0054474 A1 | 12/2001 | Braun et al. |
| 2002/0000450 A1 | 1/2002 | Brown et al. |
| 2002/0031564 A1 | 3/2002 | Beveridge |
| 2002/0033044 A1 | 3/2002 | Kawazoe et al. |
| 2002/0043732 A1 | 4/2002 | Jacino et al. |
| 2002/0053756 A1 | 5/2002 | Powell et al. |
| 2002/0058080 A1 | 5/2002 | Curl |
| 2002/0087164 A1 | 7/2002 | Speitling |
| 2002/0106610 A1 | 8/2002 | Hurson |
| 2002/0113334 A1 | 8/2002 | Matsuoka et al. |
| 2002/0163096 A1 | 11/2002 | Price |
| 2002/0193502 A1* | 12/2002 | Hare .......................... 524/588 |
| 2003/0157347 A1 | 8/2003 | Zhang et al. |
| 2003/0205831 A1 | 11/2003 | Rawlins et al. |
| 2004/0043093 A1* | 3/2004 | Price et al. ................... 425/176 |
| 2004/0046280 A1 | 3/2004 | Harrington |
| 2004/0065976 A1 | 4/2004 | Sreenivasan et al. |
| 2004/0070106 A1 | 4/2004 | Harrington |
| 2004/0096802 A1* | 5/2004 | Gittleman ....................... 433/71 |
| 2004/0110112 A1 | 6/2004 | Xie et al. |
| 2004/0130057 A1 | 7/2004 | Mehrabi et al. |
| 2004/0142150 A1 | 7/2004 | Bharadwaj et al. |
| 2004/0145086 A1 | 7/2004 | Yusa |
| 2004/0183234 A1 | 9/2004 | Colea |
| 2004/0222349 A1 | 11/2004 | Powell et al. |
| 2004/0241606 A1 | 12/2004 | Diesso |
| 2004/0262332 A1 | 12/2004 | Pauser et al. |
| 2005/0017412 A1 | 1/2005 | Maier et al. |
| 2005/0028917 A1 | 2/2005 | Rawlins et al. |
| 2005/0042420 A1 | 2/2005 | Rawlins et al. |
| 2005/0048265 A1 | 3/2005 | Bharadwaj et al. |
| 2005/0163881 A1 | 7/2005 | Pierick et al. |
| 2005/0167863 A1 | 8/2005 | Bharadwai et al. |
| 2005/0173839 A1* | 8/2005 | Crump et al. .................. 264/401 |
| 2006/0001330 A1* | 1/2006 | Matsuzaki et al. ....... 310/316.01 |
| 2006/0048832 A1* | 3/2006 | Blackmore et al. ............. 138/98 |

FOREIGN PATENT DOCUMENTS

| | | |
|---|---|---|
| CA | 1067660 | 12/1979 |
| CA | 1071822 | 2/1980 |
| CA | 1090082 | 11/1980 |
| CA | 1092768 | 1/1981 |
| CA | 1097872 | 3/1981 |
| CA | 1115015 | 12/1981 |
| CA | 1118242 | 2/1982 |
| CA | 1132814 | 10/1982 |
| CA | 1136815 | 12/1982 |
| CA | 1139917 | 1/1983 |
| CA | 1162712 | 2/1984 |
| CA | 1170014 | 7/1984 |
| CA | 1170015 | 7/1984 |
| CA | 1174820 | 9/1984 |
| CA | 1190018 | 7/1985 |
| CA | 1214612 | 12/1986 |
| CA | 1232244 | 2/1988 |
| CA | 1235559 | 4/1988 |
| CA | 1240288 | 8/1988 |
| CA | 1303314 | 12/1988 |
| CA | 1318999 | 5/1989 |
| CA | 2007976 | 1/1990 |
| CA | 2046302 A1 | 2/1990 |
| CA | 2039160 C | 8/1990 |
| CA | 2027741 | 10/1990 |
| CA | 2145611 A1 | 3/1995 |
| CA | 2238766 A1 | 5/1996 |
| CA | 2275510 A1 | 12/1997 |
| CA | 2235220 A1 | 4/1998 |
| CA | 2480025 A1 | 7/1998 |
| CA | 2341425 A1 | 8/1999 |
| CA | 2311815 A1 | 10/1999 |
| CA | 2349603 A1 | 5/2000 |
| CA | 2361468 A1 | 8/2000 |
| CA | 2318011 A1 | 9/2000 |
| CA | 2391102 A1 | 5/2001 |
| CA | 2458349 A1 | 3/2003 |
| CA | 2460871 A1 | 5/2003 |
| CA | 2481388 A1 | 10/2003 |
| CA | 2497875 A1 | 3/2004 |
| CA | 2494535 A1 | 5/2004 |
| CA | 2120948 C | 12/2004 |
| CA | 2189395 C | 7/2005 |
| CA | 2242817 C | 10/2006 |
| CA | 2410534 C | 2/2007 |
| DE | 199 05 761 A1 | 8/2000 |
| EP | 0 337 700 A2 | 10/1989 |
| GB | 2 008 023 A | 5/1979 |
| GB | 2 366 620 A | 3/2002 |
| JP | 11-352051 A | 12/1999 |
| JP | 2005351733 A | 12/2005 |

OTHER PUBLICATIONS

Canadian Intellectual Property Office, "Notice of a Requisition," issued in connection with Canadian Patent Application No. 2,567,936, dated Jan. 23, 2014.

* cited by examiner

DEVICE AND METHOD FOR SURFACE REPLICATION

FIELD OF THE INVENTION

The field of the invention generally relates to surface replication, and more particularly to devices and methods for surface replication.

BACKGROUND

It is often necessary to obtain detailed information regarding surface features of components. This can be required in areas that are only accessible by means of remote tooling or equipment. The detailed information may be required to determine if a component is fit for service based on a particular geometric feature. This would include such things as a flaw or surface defect, where a stress analysis would be required to assess if the stresses resulting from this flaw or defect were acceptable.

Replicas are regularly required to help characterize features on surfaces, such as the inside surface of pressure tubes within a nuclear reactor (e.g., a CANDU™ reactor). Pressure tube surface replication in a nuclear reactor is a remote process due to limited access and the presence of high radiation fields. Obtaining high quality surface replicas of flaws with narrow, deep and/or sharp-tipped features is difficult. Obtaining such replicas remotely and/or in wet conditions is even more difficult. Maintaining control of the replicating material during the replicating process is important; it is important that the replicating material is not 'lost' into the reactor during the replication process. Due to this handling constraint, a replicating material with moderately high viscosity must be used. Moderately high viscosity facilitates material handling and control, however, the viscous material is more difficult to apply into narrow, deep and/or sharp-tipped features. Trials with less viscous replicating material have not produced satisfactory results because of the difficulty in material handling/control.

Present replicating devices can be delivered to the location of a flaw to obtain a mould impression or replica of the surface feature. Typically, the device carries a quantity of replicating material and is able to apply the material onto the surface. The replicating material is applied in an uncured state, and cures in situ. Once the replicating material has cured, the device containing the replica is retrieved. The geometry of the surface feature is replicated as a negative impression. The replica can be inspected to determine geometric features.

Present replicating devices and processes generally work adequately for broader, open flaws with smoother surfaces and larger root radii. However, existing devices and processes have limited success with flaws that are narrow, deeper, undercut, and have small root radii. A difficulty with flaw replication relates to being able to successfully apply the replicating material into the bottom of the flaw in order to capture its features. In some instances, the replica may not be fully formed, i.e. it does not sufficiently capture the features of the flaw.

When a successful replica cannot be taken, often the worst case assumptions are made when assessing a putative flaw in a reactor pressure tube. Thus, failure to obtain replicas of sufficient quality can result in additional reactor outage time, limitations on the allowable thermal cycles for reactor pressure tubes, and may lead to unnecessary fuel channel replacement.

There remains a need, therefore, for an improved replication device and methods of use of that device.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

The present invention provides a replication device for delivering a replicating material to a surface.

In accordance with one aspect of the present invention there is provided a flaw replication device for remotely obtaining a replica of a surface, comprising: (a) a replicating plate having side walls that define an enclosure having an open end, said replicating plate being movable between a refracted position and an extended position at which the replicating plate is in contact with said surface; (b) a replicating material housing for receiving a curable thixotropic replicating material; (c) an extrusion piston slidably received within said replicating material housing and movable between a rearward position and a forward dispensing position (d) a tube in fluid communication with the enclosure in said replicating plate and the replicating material housing; and (e) an actuator for delivering stress waves to the replicating material, whereby when said replicating plate is in said extended position, movement of said extrusion piston to said forward dispensing position causes replicating material contained within said replicating material housing to be dispensed through said tube into said enclosure formed by said replicating plate and into contact with said surface, and whereby delivery of said stress waves to said replicating material reduces the viscosity of said replicating material.

In accordance with another aspect of the present invention there is provided a method of making a replica of a surface using the device according to the present invention, comprising the steps of (a) delivering a curable thixotropic material to said surface; (b) providing stress waves to said material during delivery of said material; and (c) allowing said material to cure in the absence of said stress waves.

In accordance with another aspect of the present invention there is provided a kit for the use of a flaw replication device of the present invention, comprising; a) the replication device; and b) instructions for the use thereof.

In accordance with another aspect of the present invention there is provided a kit for the use of a flaw replication device of the present invention, comprising: a) the replication device; b) a curable thixotropic material; and c) instructions for the use thereof.

In accordance with another aspect of the present invention there is provided a kit for the use of a flaw replication device with an actuator, comprising: (a) the actuator; and (b) instructions for the use thereof.

Figure 1:
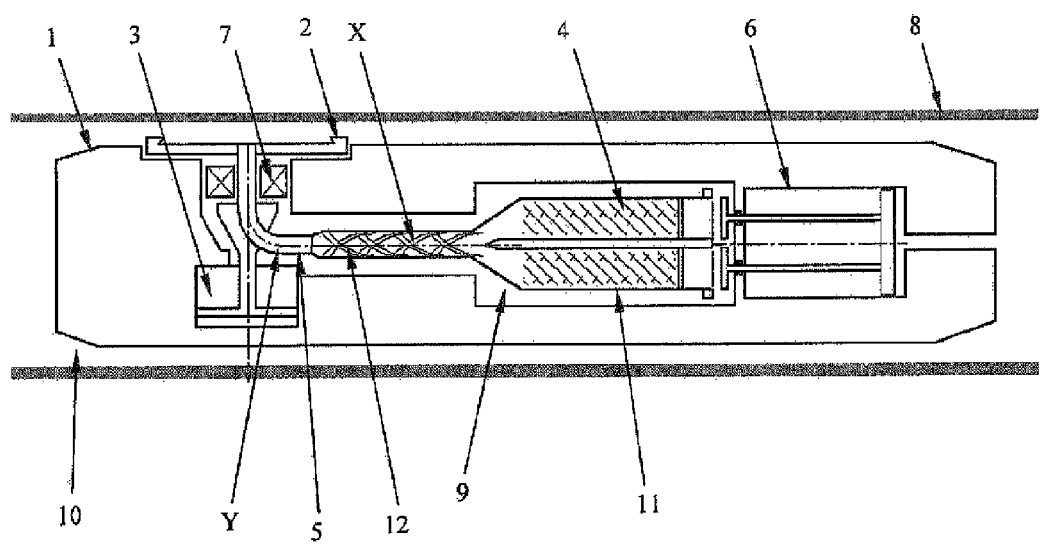
FIG. 1 is a cross-section of one embodiment of the replication device of the present invention.

The numbers in bold face type serve to identify the component parts that are described and referred to in relation to the drawings depicting various embodiments of the present invention. It should be noted that in describing various embodiments of the present invention, the same reference numerals have been used to identify the same or similar elements. Moreover, for the sake of simplicity, parts have been omitted from some figures of the drawings.

DETAILED DESCRIPTION OF THE INVENTION

As will be discussed in more detail below, the present invention provides a replication device, and method, for surface replication. The device of the present invention comprises some of the features of standard replicating devices known in the art. As in certain replicating devices known in the art, the device of the present invention makes use of a device body, a replicating plate, an extendable mount, a replicating cartridge housing and an extrusion piston. In the device of the present invention, these features are combined with an actuator for delivering vibrations in the form of stress waves to a thixotropic replicating material, during material application. Thixotropy refers to a physical property of a material whereby the viscosity of the material is affected by stress. A thixotropic material becomes less viscous in the presence of stress. The temporary reduction in viscosity of the replicating material during injection allows the replicating material to better penetrate into flaws during the injection process. Once the initial injection is complete the vibration induced stresses are removed, which restores the higher viscosity in order to maintain control of the material inside the reactor.

Replicating Device

One example of the replicating device of the present invention is shown in FIGS. 1-4. In this example, a section of a pressure tube is shown to illustrate the arrangement of the device with respect to the surface to be replicated.

The main components of the replicating device 10 include: device body 1; replicating plate 2, extendable mount 3; replicating cartridge housing 11, extrusion piston 6 and piezo-actuator 7.

Device body 1 provides support for the components of replicating device 10. In the example of FIGS. 1-4, device body 1 is a generally cylindrically shaped body, which is useful for obtaining replicas from the inside surface 8 of generally cylindrical pressure tubes, pipes and other similarly shaped surfaces. It will, however, be clear to the skilled worker that surface replicas may be obtained from other shapes of components. A different shape of device body 1 may be used to facilitate replication of differently shaped surfaces. Additionally, device body 1 may be a adapted to be removably or fixedly attached to an additional module(s) used in flaw replication. As used herein, the term 'replica' generally refers to a negative impression of a surface made using the flaw replication device of the present invention.

Figure 3:
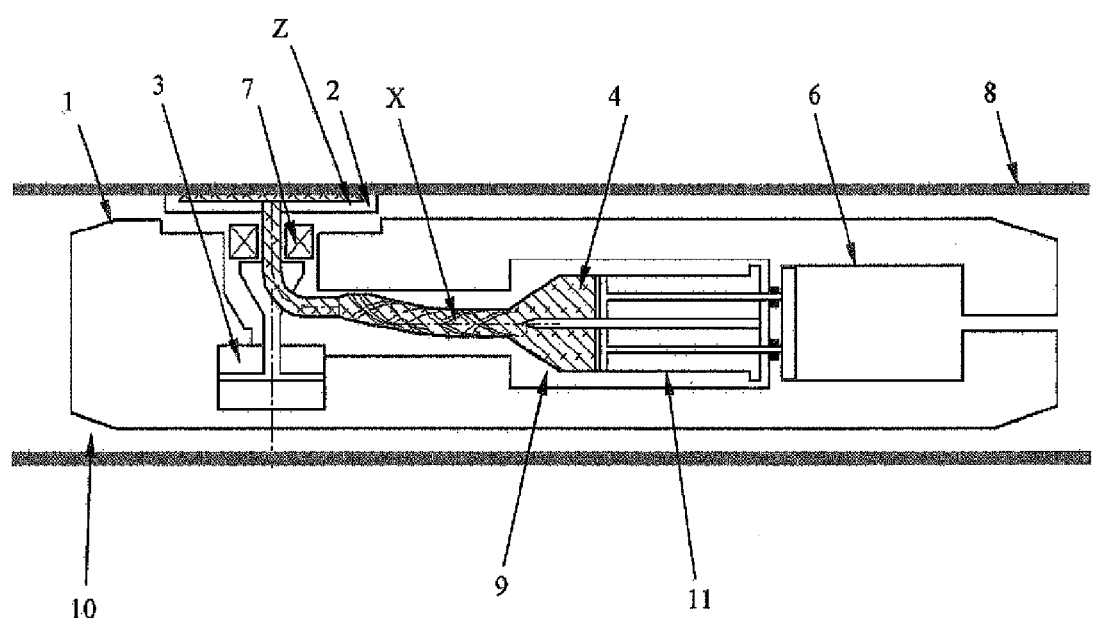
FIG. 3 is a cross-section of the replication device shown in FIG. 1, in which the replicating material is between the replicating mount and the surface of the component being replicated.
Figure 4:
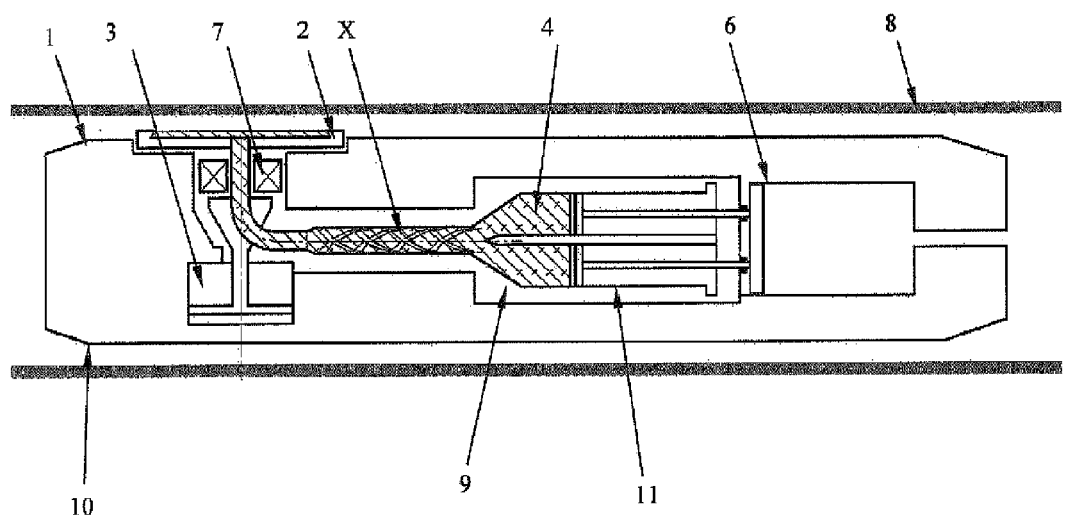
FIG. 4 is a cross-section of the replication device shown in FIG. 1, in which cured replicating material is retained on the replicating mount.

Replicating plate 2 acts as a dam and retains replicating material 4 at, or generally surrounding, the feature being replicated. Replicating plate 2 includes sidewalls that define an enclosure having an open end and is movable between a retracted position and an extended position. In the extended position, the side walls of replicating plate 2 are in contact with the surface to be replicated such that the enclosure defined by the sidewalls is closed and suitable for delivering the replicating material into contact with the surface to be replicated. Replicating plate 2 optionally includes retaining means (not shown) that ensures the cured replicating material adheres to replicating plate 2 when replicating plate 2 is retracted and the replica is removed from the component being replicated. In one example, as shown in FIGS. 3 and 4, the retaining means of replicating plate 2 includes dove-tail grooves Z that aid in retaining the cured replica when the replica is retracted from the surface. In another example, the retaining means of replicating plate 2 includes a T-slot and/or a geometry with an undercut for assisting in retaining the replica.

Replicating plate 2 is removably mounted to extendable mount 3. Extendable mount 3 is moveable from a retracted position to an extended position, and is adapted to reversibly retract and extend replicating plate 2. Extendable mount 3 is remotely user operable to extend replicating plate 2 into contact with the surface prior to replication, and to retract replicating plate 2 once the replica is obtained. Extendable mount 3 optionally includes means for tilting replicating plate 2 to keep replicating plate 2 in contact with the inside surface of a pressure tube or other surface. In one example, replicating plate 2 is pivotally attached to extendable mount 3. The ability of replicating plate 2 to tilt is advantageous if the inside surface of the component is irregularly shaped, such as in the case of a sagged pressure tube.

Extendable mount 3 and replicating plate 2 may optionally be spring loaded to retract as a failsafe mechanism. Such a failsafe mechanism is a safety redundancy which is desirable in the event of a power failure, malfunction or other failure occurs with the extendable mount 3 or its control system. If such a malfunction were to occur with extendable mount 3 in the extended position, it may be difficult to remove the replicating device 10 from the reactor. To help to avoid this possibility, extendable mount 3 can be spring-loaded so that it will return to the retracted position on its own. For example, in the event of a pneumatic or hydraulic system problem (e.g., an O-ring seal leak in extendable mount 3, solenoid valve malfunction or tubing failure in the controlling system outside of the replicating device) extendable mount 3 and replicating plate 2 will retract to ensure the device can be easily retrieved from the pressure tube. Additionally, the front and rear edges of extendable mount 3 and replicating plate 2 may be shaped (for example, tapered) to facilitate removal of device 10 from a pressure tube under back-out conditions.

Figure 2:
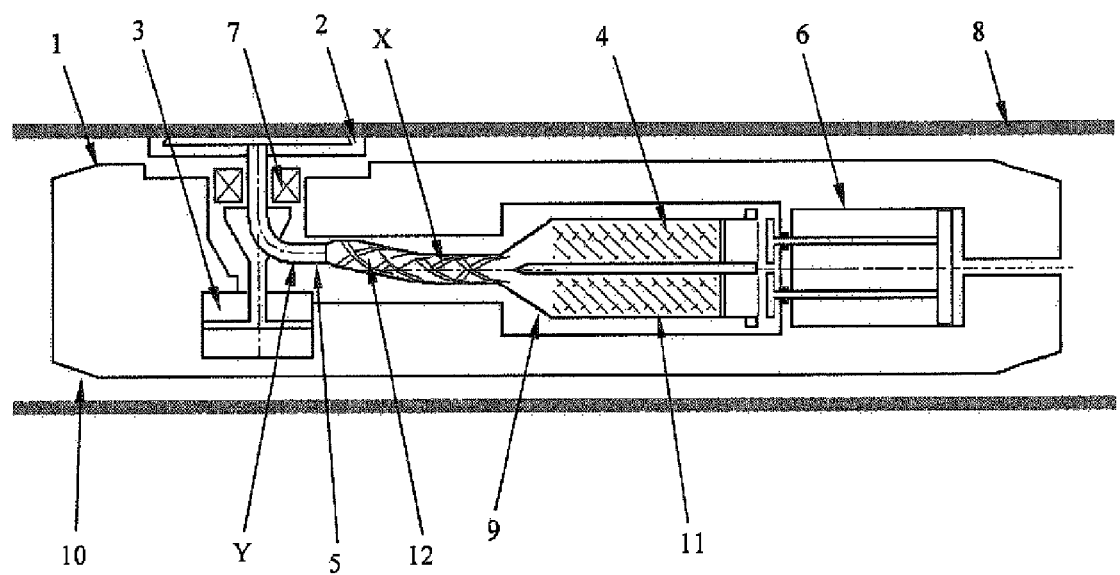
FIG. 2 is a cross-section of the replication device shown in FIG. 1 in which the replicating mount is in contact with surface of component being replicated.

Movement of extendable mount 3 from the retracted position to the extended position causes replicating plate 2 to move from a retracted position (as depicted in FIGS. 1 and 4) to an extended position (as depicted in FIGS. 2 and 3). In the extended position replicating plate 2 contacts the surface of the component being replicated. Replicating plate 2 is sized to mate with the surface of the component to be replicated. Extendable mount 3 can be a pneumatic or hydraulic piston.

Housing 11 is sized to receive a supply of replicating material 4 in a replicating material cartridge and in an amount sufficient to form at least one replica. In the specific example depicted in FIGS. 1-4, replicating material 4 is an uncured and un-mixed, two-part, thixotropic replicating material that is commercially available and supplied in a double syringe 9. In this example, one syringe tube contains a base and the other syringe tube contains a catalyst. An example of replicating material 4 includes Express Vinyl Polysiloxsane Impression Material System from 3M. In addition to its thixotropic properties, the Express Vinyl Polysiloxsane Impression Material System from 3M is suitable for use in wet conditions, as can be encountered within a pressure tube. It will be clear to the skilled worked that other thixotropic materials may be used.

The properties and/or criteria considered for selecting a thixotropic material includes the percent shrinkage of the material, dimensional stability, radiation tolerance, mixing method(s), affinity to water, working time, cure time, temperature range, viscosity, chemical composition, physical form, and mechanical properties.

It will be clear to the skilled worker that when evaluating the above-noted properties and/or criteria, it is necessary to find a balance among them. Often a specific material will have desirable characteristics with respect to one criterion, and not with another. The overall evaluation must consider whether shortcomings of a particular material are offset by other positive characteristics, in particular, in relation to the specific application. Criteria that should be considered, include:

1. Material percent shrinkage of the material as it transforms from the uncured state to the cured state should be minimized to the extent possible in view of other required characteristics.
2. Dimensional stability should be maximized (i.e., minimal dimensional change over time) to the extent possible in view of other required characteristics. As used herein, dimensional stability refers to the ability of the material to maintain its shape/size over time. If the material is dimensionally unstable, then the geometry from the replica will vary with time. Example of dimensional instability include shrinkage and warping. Desirably, the replica geometry remains the same over the time necessary to analyse the replica.
3. If the replica is to be made in an environment with radiation present, radiation tolerance should be maximized.
4. Material mixing method(s) should be as simple as possible and the material should be amenable to remote mixing. For example, certain materials require extensive mixing/stirring to adequately combine the replicating material, while other materials mix readily.
5. If the material is going to come in contact with water, the material must be able to cure in the presence of water and/or when completely submerged in water.
6. The material working time (i.e., the period of time between initiation of mixing and start of setting or curing) must be sufficient to allow the material to be applied, however, in most circumstances, a very long working time may undesirable because it extends the overall time required to obtain a replica. Additionally, it is not typically desirable to disturb the material once it has begun to cure, thus, the working time defines how much time following mixing that is available for application of the material to the component surface.
7. The material cure time (i.e., the time period from which the material begins to cure until it is fully cured) should be reasonably short in order to reduce the time required to obtain a replica, however, slower cure times are normally associated with lower percent shrinkage. Accordingly, a balance between the two conflicting criteria must be reached taking into consideration the requirements of the specific application.
8. The allowable temperature range of the material should match the expected temperature of the surface being replicated and its environment. For example, replicating materials will have a minimum and maximum allowable operating temperature range. The material chosen will have an allowable temperature range that falls within or encompasses the temperature or temperature range the environment in which it is being used.
9. The material viscosity range in the absence of stress waves must be such that it is high enough to facilitate remote handling, yet low enough in the presence of stress waves to allow the compound to form onto the component surface to obtain an accurate replica.
10. The chemical composition must be compatible with the reactor systems that the material will contact. For example, the replicating material should not adversely react with the component surface material.
11. The physical form must be evaluated with respect to how this affects ease of handling and application. A solid (granular), liquid or gaseous material may be more difficult to control, mix, and apply than a material in gel or paste form.
12. The mechanical properties must be evaluated for suitability. Mechanical properties of interest may include hardness, tensile strength, tear strength, and maximum percent elongation.

Tube 5 connects double syringe 9 to an orifice (not shown) in replicating plate 2. Tube 5 has a first end that is attached to the double syringe injection port (not shown), and a second end that is attached to an orifice in replicating plate 2. In accordance with a specific embodiment of the present invention, tube 5 includes a mixing tube X in which components of the replication material are mixed and a delivery tube Y through which the mixed material passes before going through the orifice in the replication plate. Internal baffles 12 in mixing tube X ensure that the components of the material flow together and are adequately mixed during material extrusion and delivery. The skilled worker will be familiar with features other than, or in addition to, baffles 12 that will promote mixing.

Extrusion piston 6 is movable from a retracted position to a dispensing position. When moved from the retracted position to the dispensing position, extrusion piston 6 is adapted to extrude material 4 from syringe 9 forcing it through tube 5 and through the orifice in replicating plate 2 in to the enclosure. In the examples depicted in the Figures, extrusion piston 6 includes dual plungers each individually received within a barrel of the double syringe. Extrusion piston 6 can be, for example, a pneumatic or hydraulic piston.

Actuator 7 is operable to transmit vibrations as stress wave of sufficient amplitude to replicating material 4 so as to cause a reduction in the viscosity of replicating material 4 during material injection. In the example of the Figures, actuator 7 is a piezo-actuator. The piezo-actuator is operable over a range of frequencies, from about 10 Hz to greater than 2000 Hz. In the embodiment in which the replicating material used is Express Vinyl Polysiloxane Impression Material System from 3M, desirably the actuator produces vibrations at about 60 Hz. The use of actuator 7 results in a temporary reduction in the viscosity of replicating material 4 during injection, which enables replicating material 4 to penetrate into the features of the surface being replicated. In the example depicted in the Figures, actuator 7 is positioned adjacent to replicating plate 2 so as to impart stress waves to material 4 during delivery of the material to the surface. A signal generator and amplifier (not shown) are connected to the piezo-actuator using electrical signal cables and are used to control the piezo-actuator remotely from the replicating device.

It will be clear to the skilled worker to select materials for replicating device 10 that are suitable for the conditions in which replication device 10 will be utilized. Desirably, material for mechanical components are selected for their suitability for use inside CANDU™ reactors (i.e., no halogens, no sulphur, no cobalt) as well as their corrosion resistance, and mechanical durability. Stainless Steel (Type 304 & Type 17-4 PH) and Aluminum (Type 7075 & Type 6061) are examples of materials that may be used. Additionally, materials can be selected based on their acceptance and approval from reactor operators and appropriate regulatory bodies.

Method for Obtaining a Replica

The following steps may be performed to obtain a replica using the replication device. It should be appreciated that although this discussion is specific to flaw replication in a pressure tube, the present method is useful for replication of a portion of any surface. Flaw replication in a pressure tube is described as a specific example to demonstrate the use of the method of the present invention.

As part of routine surveillance, or when a flaw is suspected, an internal surface of a pressure tube may be remotely inspected by a variety of methods including, but not limited to, visual detection and characterization by video camera, surface profiling by ultrasonics and/or volumetric flaw characterization by eddy current analysis. When a flaw is detected, or suspected, the internal surface feature may be characterized by replication.

Prior to insertion of device 10 into a defuelled pressure tube, double-syringe 9, containing uncured thixotropic replicating material 4 is mounted in device body 1. Extendable mount 3 and extrusion piston 6 are both in the retracted position (as shown in FIGS. 1 and 2). Replicating device 10 is positioned such that replication plate 2 is generally aligned with the surface feature (not shown) to be replicated. Extendable mount 3 is moved from the retracted position to the extended position to bring extendable mount 3 into contact with the surface (as shown in FIGS. 2 and 3).

Extrusion piston 6 is actuated to extrude material 4 from double syringe 9. The two-part material is forced through tube 5 and the mixture is injected into the volume of space defined by the surface and replicating plate 2. Actuator 7 is operated during material injection to temporarily lower the viscosity of material 4. Actuator 7 is turned off once injection is complete.

Following injection of the material, replication device 1 remains stationary to allow the replicating material to cure. The typical cure time for Express Vinyl Polysiloxane Impression Material System from 3M is approximately ten minutes. It will be well understood by the skilled worker that cure times vary depending on the replicating material used, and/or the overall conditions.

Typically, each replica requires the use of a separate replicating plate and a new cartridge of material. However, a single cartridge may contain sufficient material for multiple applications. In this case, extrusion piston 6 is extended only enough to extrude sufficient material to fill the volume of space defined by replicating plate 2.

Once the material has cured, and a replica has been formed (not shown), piston 3 is retracted, thereby retracting replicating plate 2 and withdrawing the formed replica. Replication device 10 is then retrieved from the pressure tube, thereby permitting the replica to be inspected.

Replicating Device Kit

It is also an aspect of the present invention to provide a kit for the use and/or assembly of the flaw replication device. The kit provides a replication device and instructions for the use thereof, and optionally includes replicating material. Another example of a kit includes an actuator, preferably a piezo-actuator, with instructions for adapting the actuator for use with a flaw replication device that lacks an actuator for imparting stress waves to the replicating material. In this instance, the kit allows previous replication devices to be "retrofitted" with such an actuator.

All publications, patents and patent applications referred to in this Specification are indicative of the level of skill of those skilled in the art to which this invention pertains and are herein incorporated by reference to the same extent as if each individual publication, patent, or patent application was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A flaw replication device remotely operable for obtaining a replica of an inner surface of a tubular vessel, comprising:
   (a) an elongate body configured for reception in said tubular vessel;
   (b) a replicating plate extendably mounted to said body, said plate having side walls that define an enclosure having an open end, said replicating plate being movable between a retracted position and an extended position at which the side walls of the replicating plate are in contact with said surface through which the enclosure is closed;
   (c) a replicating material housing within said body for receiving a curable thixotropic replicating material;
   (d) an extrusion piston slidably received within said replicating material housing and movable between a rearward position and a forward dispensing position;
   (e) a tube providing fluid communication between the enclosure defined by the side walls in said replicating plate and the replicating material housing; and
   (f) an actuator operatively coupled to the tube between the replicating plate and the replicating material housing for delivering stress waves to the replicating material during injection and delivery to the surface,
   whereby when said replicating plate is in said extended position, movement of said extrusion piston to said forward dispensing position causes replicating material contained within said replicating material housing to be dispensed through said tube into said enclosure formed by said replicating plate and into contact with said surface, and whereby delivery of said stress waves by said actuator to said replicating material reduces the viscosity of said replicating material during injection and delivery to the surface.

2. The flaw replication device according to claim 1, wherein the actuator is a piezo-actuator.

3. The flaw replication device according to claim 2, wherein the piezo-actuator is operable over a frequency range of about 10 Hz to about 2000 Hz.

4. The flaw replication device according to claim 3, wherein the piezo-actuator is operable at a frequency of about 60 Hz.

5. The flaw replication device according to claim 1, wherein the replicating plate includes retaining means for retaining cured replicating material.

6. The flaw replication device according to claim 5, wherein the retaining means is a dove-tail joint, a t-slot or an undercut.

7. The flaw replication device of claim 1, wherein the replicating material is a two part composition and the replicating material housing comprises two compartments for separately housing the two parts of said replicating material.

8. The flaw replication device of claim 7, wherein the tube is adapted to mix the two parts of said two part composition.

9. The flaw replication device according to claim 8, wherein said tube further comprises baffles for mixing the two parts of said two part composition.

10. The flaw replication device according to claim 1, wherein the extrusion piston is a pneumatic piston.

11. The flaw replication device according to claim 1, wherein the extrusion piston is a hydraulic piston.

12. The flaw replication device according to claim 1, wherein the actuator is positioned adjacent to the replicating plate.

13. The flaw replication device according to claim 1, wherein the actuator is oriented so as to deliver the stress waves to the replicating material transverse to the direction of dispensation through the tube.

14. The flaw replication device according to claim 1, wherein the actuator is operable to transmit vibrations to the replicating material of amplitude that causes a reduction in the viscosity of the replicating material during injection and delivery to the surface.

15. The flaw replication device according to claim 1, wherein mechanical components in the flaw replication device are made from material suitable for use inside a nuclear reactor pressure tube.

16. The flaw replication device according to claim 15, wherein the mechanical components in the flaw replication device are made from stainless steel or aluminum.

17. The flaw replication device according to claim 16, wherein the stainless steel is type 304 or type 17-4 PH and wherein the aluminum is type 7075 or type 6061.

18. The flaw replication device according to claim 15, wherein the mechanical components in the flaw replication device do not contain halogens, sulphur, or cobalt.

19. A method of making a replica of a surface using the device according to claim 1, comprising the steps of:

(a) delivering a curable thixotropic material to said surface;
(b) providing stress waves to said material during delivery of said material; and
(c) allowing said material to cure in the absence of said stress waves.

20. The method according to claim 19, wherein the curable thixotropic material is a two component material comprising a material base and a catalyst.

21. The method according to claim 20, wherein the curable thixotropic material is a vinyl polysiloxsane impression material.

22. The method according to claim 19, wherein the stress waves are in a frequency range of about 20 Hz to about 2000 Hz.

23. The method according to claim 22, wherein the stress wave are at a frequency of about 60 Hz.

24. A kit for the use of a replication device according to claim 1, comprising:
 a. the replication device; and
 b. instructions for delivering a replicating material into contact with a surface while providing stress waves to the replicating material during delivery.

25. A kit for the use of a replication device according to claim 1, comprising:
 a. the replication device;
 b. a curable thixotropic material; and
 c. instructions for delivering the curable thixotropic material into contact with a surface while providing stress waves to the curable thixotropic material during delivery.

26. The kit according to claim 25, wherein the curable thixotropic material is a vinyl polysiloxsane impression material.

* * * * *